July 22, 1969 P. P. KEENAN 3,457,490
MULTIPACTOR RECTIFIER
Filed Feb. 25, 1965 4 Sheets-Sheet 1

INVENTOR.
PETER P. KEENAN
BY
George Sullivan
Agent

INVENTOR.
PETER P. KEENAN
BY George A. Sullivan
Agent

INVENTOR.
PETER P. KEENAN
BY
Agent

July 22, 1969    P. P. KEENAN    3,457,490
MULTIPACTOR RECTIFIER
Filed Feb. 25, 1965    4 Sheets-Sheet 4

INVENTOR.
PETER P. KEENAN
BY
*George C. Sullivan*
Agent

United States Patent Office 3,457,490
Patented July 22, 1969

3,457,490
MULTIPACTOR RECTIFIER
Peter P. Keenan, Van Nuys, Calif., assignor to Lockheed Aircraft Corporation, Burbank, Calif.
Filed Feb. 25, 1965, Ser. No. 435,232
Int. Cl. H02m 7/26
U.S. Cl. 321—8
1 Claim

ABSTRACT OF THE DISCLOSURE

A rectifier with spaced electrodes which support a multipactor discharge in a waveguide cavity when coupled to a source of microwave energy. At least one of the electrodes is perforated to leak electrons to a collecting anode during the multipactor discharge. The collecting anode is connected to the electrode through a direct current load circuit.

---

This invention relates generally to power conversion systems and more particularly to a multipactor rectifier device for rectifying high level microwave energy.

Transmission of electric power has traditionally been accomplished with the use of wire or cable. Now, however, a new technology is evolving with the development of high power microwave generators, whereby power may be transmitted at microwave frequencies without wires and through hollow pipes or by radiation beaming. Utilization of this high frequency electrical energy generally requires rectification to direct current power and it is a primary object of this invention to provide a high efficiency rectifier for such purposes.

Several types of microwave energy converters are presently known. One type converts the radio frequency energy into heat and the heat is then used to accomplish mechanical work. This type is characterized by the low efficiency obtainable from thermal cycles wherein over-all conversion efficiencies of 10-20% would be considered good. A second type of rectifier directly converts microwave energy into direct current energy via the principle of "running a magnetron backwards." Such a device would normally be expected to have efficiencies of the order of forty percent (40%). It requires, of course, large direct current magnetic fields, rather complex circuitry and filament and anode power. A third type uses a grid of solid state diode rectifiers. It is characterized by maximum power levels of the order of 100 watts (continuous wave) and thirty percent (30%) rectification efficiencies. A promising S-band thermionic diode has reportedly also been developed which has produced 900 watts direct current with an efficiency of fifty percent (50%).

The present invention provides a simple microwave rectifier having high power capabilities (in the order of 10 kilowatt average power and magawatts peak power) as well as high efficiency. The device uses multipactor discharge phenomena to accomplish microwave rectification. Results indicate conversion efficiencies upwards to 80-90% are obtainable.

The term "multipactor" as used herein is derived from "multiple electron impact." A multipactor discharge consists of a thin electron cloud that is driven back and forth across a gap in response to a radio frequency field applied across the gap. For the discharge to be self-sustaining, the secondary emission coefficient of the surface of the electrodes must be greater than unity and the magnitude and frequency of the applied radio frequency field is preferably adjusted so that the electron cloud traverses the gap during a half cycle of the radio frequency field. Under these conditions, successive impacts of the electron cloud produce an increasing electron density. As the electron density increases, however, mutual repulsion causes some of the electrons to fall out of step with the field and thus limit the maximum electron density to a value controlled by the secondary emission coefficient. Thus, for a multipactor discharge to be self-sustaining in the preferred fundamental mode, it is necessary that: (1) the traversal time of the electron cloud be one-half (½) the radio frequency period and, (2) the velocity of electron impact correspond to the range in which the secondary emission coefficient is greater than unity.

Resonant conditions also hold for electron transversal times of 3/2, 5/3—of the radio frequency period. However, these higher order modes are weaker than the fundamental multipactor mode due to the greater likelihood of falling out of step with the radio frequency field.

Multipactor discharge phenomenon has been known for many years and has served to explain excessive loading effects in klystrons and other microwave high power tubes. It has been usefully applied in the prior art to perform microwave switching and duplexing functions.

The general characteristics of the fundamental multipactor mode can be obtained by solving the equations of motion for a single electron in the multipactor gap:

$$d^2x/dt^2 = (e/m)E_o \sin(\omega t + \phi)$$

where $(e/m)$ is the electron charge-to-mass ratio, $E_o$ is the amplitude of the applied radio frequency field of radian frequency $\omega$ and $\phi$ is the phase angle of the electron motion relative to the radio frequency field.

The above equation assumes low pressures where electron collisions with gas molecules can be neglected. Solving the above equation successively for the electron velocity and the displacement and substituting the above requirements for a self-sustaining discharge:

$$V_i = \left[\frac{k}{(k-1)}\right](2eE_o/m\omega)\cos\phi \qquad (1)$$

$$V_o = E_o d = \frac{(\omega d)^2}{(e/m)\left[\left(\frac{k+1}{k-1}\right)\pi\cos\phi + 2\sin\phi\right]} \qquad (2)$$

where $V_i$ is the velocity of impact, $k = V_i/V_o$ is the ratio of the impact velocity to the emission velocity of the secondary electrons, $d$ is the spacing between the multipactor electrodes and $V_o$ is the radio frequency voltage applied across the electrodes. From Equation 2 it can be shown that for a fixed frequency, gap spacing and velocity ratio that the minimum sustained discharge voltage occurs for $$\phi = \tan^{-1}(2/\pi)[(k-1)/(k+1)] \qquad (3)$$

Extensive measurements have indicated good agreement with the above theory for maintaining multipactor discharges.

In accordance with the teachings of this invention, high energy electrons in the multipactor discharge cloud are allowed to escape through perforations in at least one of the electrodes across which the discharge occurs. The escaping electrons are collected to provide the direct current energy output of the rectifier.

It is a basic object of this invention to provide a vacuum cavity device for converting microwave energy to direct current energy by the extraction of high energy electrons from a multipactor discharge.

It is another object of this invention to provide a multipactor rectifier capable of either continuous or pulsed operation at power levels up through the megawatt range.

It is another object of this invention to provide a simple microwave rectifier device capable of operating without filament or anode power.

Another object of this invention is to provide a microwave rectifier device with excellent radiant heat dissipation characteristics for continuous high power operation and which is readily adaptable by virtue of its construction to use of auxiliary fluid conduct cooling systems.

Another object of this invention is to provide a multipactor vacuum cavity rectifier device which may be used as a microwave amplifier.

Still another object of this invention is to provide a multipactor device which will, by use of an electrode material which is both fluorescent and secondary electron emitting, produce coherent optical radiation (laser light).

Further and other objects will become apparent from a reading of the following detail description, especially when considered in combination with the accompanying drawing wherein like numbers refer to like parts:

Figure 1:
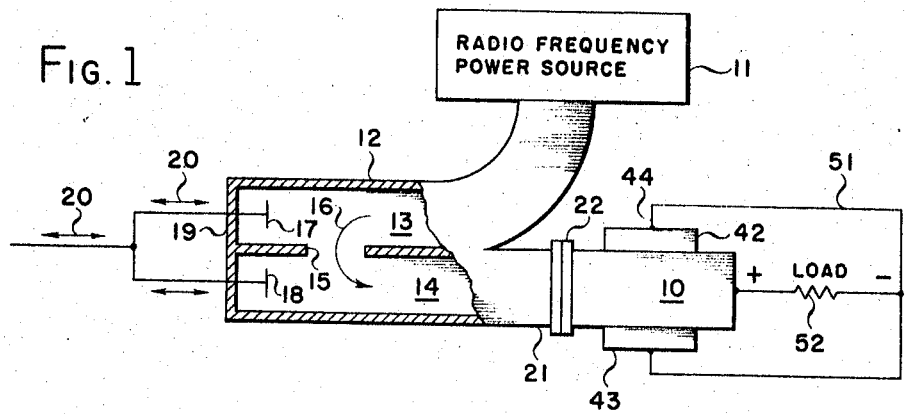
FIGURE 1 is a fragmentary view of a typical system incorporating the multipactor device of this invention.

Referring to FIGURE 1, multipactor rectifier 10 is supplied microwave energy from a suitable radio frequency (RF) power source 11 through a sidewall hybrid waveguide 12. The energy from cavity 13 is transferred to cavity 14 through slot 15 as indicated by arrow 16. Shorting plates 17 and 18 carried within the sidewall hybrid adjacent end plate 19 are movable together and independently as indicated by arrows 20 to tune the hybrid for achieving maximum energy transfer from input waveguide cavity 13 to output cavity 14.

Figure 2:
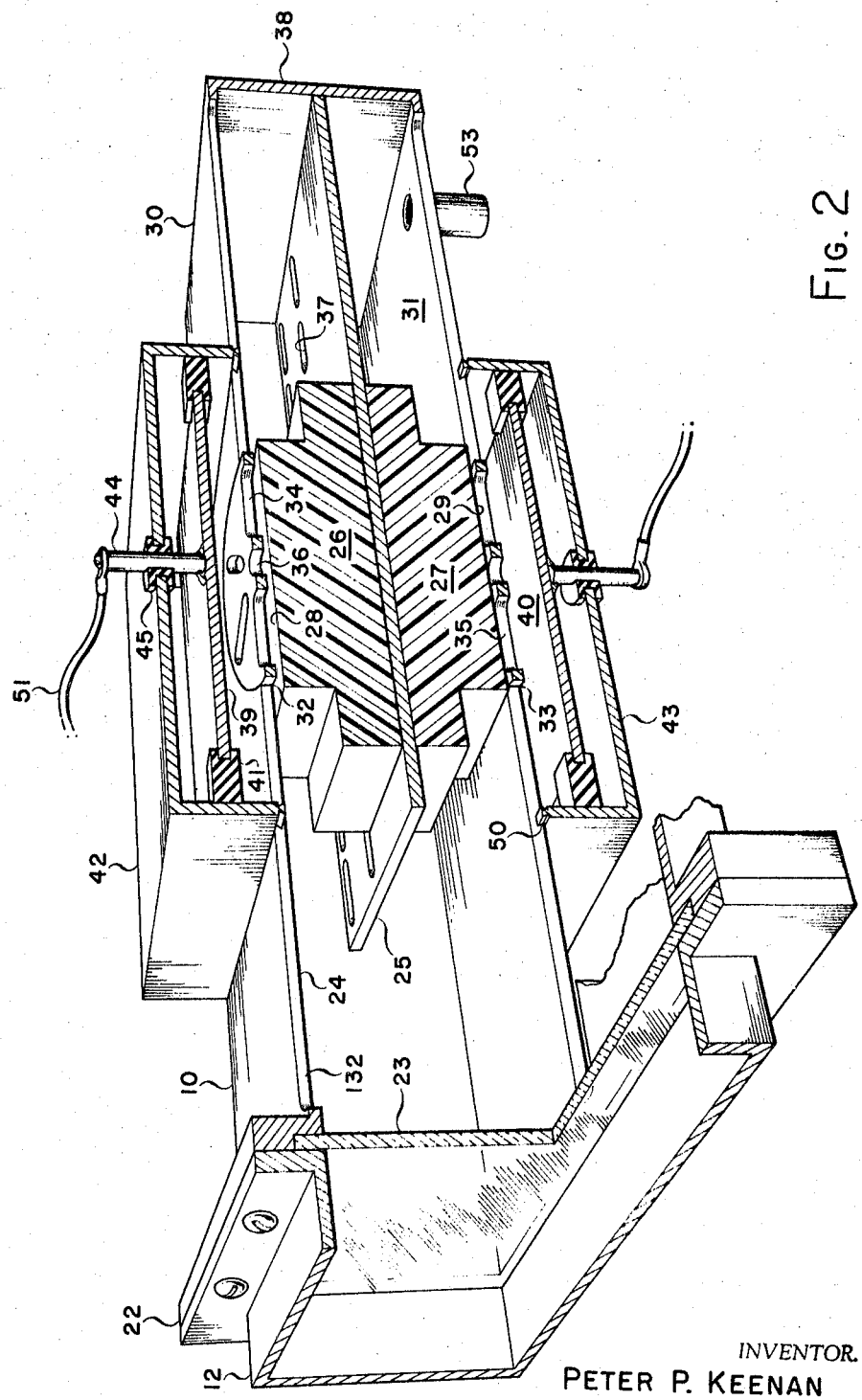
FIGURE 2 is a sectional perspective view of the multipactor device incorporated in the system shown in FIGURE 1.

Multipactor rectifier 10 is suitably coupled to the exit end 21 of sidewall hybrid waveguide 12 such as by bolt receiving flanges 22 as best shown in FIGURE 2. In FIGURE 2 a waveguide vacuum window 23 is suitably mounted within the waveguide at the flange joint to permit air evacuation of rectifier 10 while permitting the free transfer of microwave energy from the sidewall hybrid into the reentrant waveguide cavity 24 of the rectifier. Reentrant cavity 24 of the rectifier is bifurcated by electrically conductive plate 25 secured at its peripheral edge to the narrow wall of the cavity. Mounted on plate 25 are a pair of stepped blocks 26 and 27 arranged in base-abutting relationship, one on either side of the plate. At least the exposed surfaces of blocks 26 and 27 are electrically conductive. Opposed surfaces 28 and 29 of blocks 26 and 27 lie generally parallel to and closely adjacent but spaced from wide walls 30 and 31 of the rectifier cavity. These surfaces 28 and 29 of stepped blocks 26 and 27 serve as electrodes in producing the multipactor discharge necessary for rectification of the microwave energy. This stepped block configuration also provides a non-reflective transmission path for the microwaves. That is, it matches the low impedance cavity to the high impedance waveguide. In wide walls 30 and 31 of the rectifier cavity, there are openings 32 and 33 about the same size areawise as surfaces 28 and 29 for receiving perforated electrodes 34 and 35. These electrodes 34 and 35 cooperate with electrode surfaces 28 and 29 of stepped blocks 26 and 27 to produce the multipactor discharge. Hence, the surface of electrodes 34 and 35 like the electrode surfaces 28 and 29 are of a material having a secondary emission coefficient which is greater than 1 and preferably much higher. A secondary emission coefficient approaching infinity would be optimum, although in practice of course this is not obtainable. As presently known, silver and magnesium oxides and alloys are the preferred materials for the electrode surfaces. The secondary emission coefficient for certain silver-magnesium alloys has been measured to be in excess of 10 and this may be significantly increased in high vacuum. A secondary emission coefficient of 24 has, for example, been obtained for magnesium oxide in a high vacuum environment. A high secondary emission coefficient implies low electron emission velocity and a value of $k$ in Equations 1, 2 and 3 above much greater than 1 as is desirable for maintaining the multipactor discharge.

The perforations or holes 36 in electrodes 34 and 35 may be of any desired planiform shape (i.e., round, elongated, etc.) and are preferably of a size in the order of one-tenth (1/10) wavelength, and, to avoid resonance, they must be dimensionally less than one-qaurter (1/4) wavelength. Also, the hole arrangement must be such that they will not interfere with microwave current flow in the cavity. A maximum number of perforations or holes is desired, limited only by the secondary emission coefficient—the coefficient must be greater than 1 to maintain the multipactor discharge. In practice, the perforated electrodes preferably have in the order of ninety percent (90%) of their area open and as such would be similar in appearance to a screen or the like. The electrodes may be made of the secondary electron emitting material or of another material and coated with a secondary electron emitting material. In this connection, it should be noted that there is a wide variety of materials which will emit secondary electrons on bombardment by an electron beam. The secondary electron emitting materials suitable for use as the electrodes in accordance with the teachings of this invention are those capable of a secondary emission coefficient greater than 1.

The optimum spacing between electrodes 28 and 34, and 29 and 35, will vary somewhat, depending upon the frequency and power level of the applied microwave energy but will generally be in the order of one-hundredth to one-tenth (0.01 to 0.1) wavelength. The size of the electrodes in terms of surface length is preferably a multiple of one-half (1/2) the wavelength, $\lambda$, of the applied microwave energy.

Bifurcating plate 25 in the rectifier cavity has a conductive surface and effectively splits the microwave energy entering the rectifier cavity, thus doubling the power handling capability of the device. It also doubles the obtainable direct current voltage from the rectifier for a given microwave power level density in the separate cavities as the multipactor discharge takes place across the electrodes in the two halves of the cavity. By slotting the bifurcating plate 25 adjacent the walls and blocks as indicated at 37 in FIGURE 2, the flow of microwave eddy currents on the surface of plate 25 is minimized to reduce the heat losses in the cavity.

A transverse electric (TE) mode is assumed for the microwave energy in the rectifier cavity. In this mode, the electric field in the cavity is transverse to the waveguide axis and the magnetic field is parallel to that axis. The end wall 38 of rectifier cavity 10 shorts the waveguide and produces a standing wave resonance condition wherein the electric field of the applied microwave energy is concentrated at the electrodes, producing the multipactor discharge. The high energy electrons in the multipactor discharge which escape through the holes 36 in perforated electrodes 34 and 35 are collected by plates or anodes 39 and 40. The anodes are suitably mounted adjacent the perforated electrodes outside the waveguide cavity 24 of the rectifier 10 by insulating brackets 41 secured to cover plates 42 and 43. A terminal post 44 is conductively connected to each anode 39 and 40 to project through an insulating bushing 45 in the wall of covers 42 and 43. Covers 42 and 43 may be secured to cavity walls 30 and 31 of the rectifier by any suitable means such as key ways 50 which will maintain a fluid tight joint. The free end of each post 44 connects with a conductor 51 which is coupled into the direct current load circuit 52 as schematically illustrated in FIGURE 1. The high energy electrons collected on anodes 39 and 40 represent the rectified output energy from multipactor device 10 which drives the load circuit 52 through the series connection between the anodes and the conductive wall of the rectifier device.

The vacuum environment needed for the multipactor discharge in the rectifier cavity may be obtained by evacuating the air through check valve 53.

Figure 4:
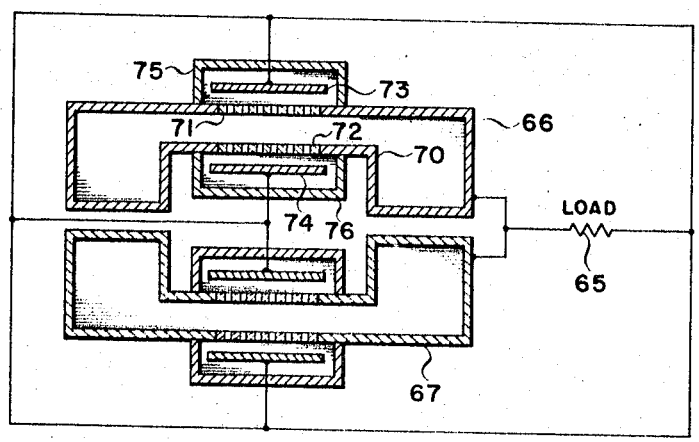
FIGURE 4 is a sectional view showing the modified form of the invention device as used in the FIGURE 3 system.
Figure 3:
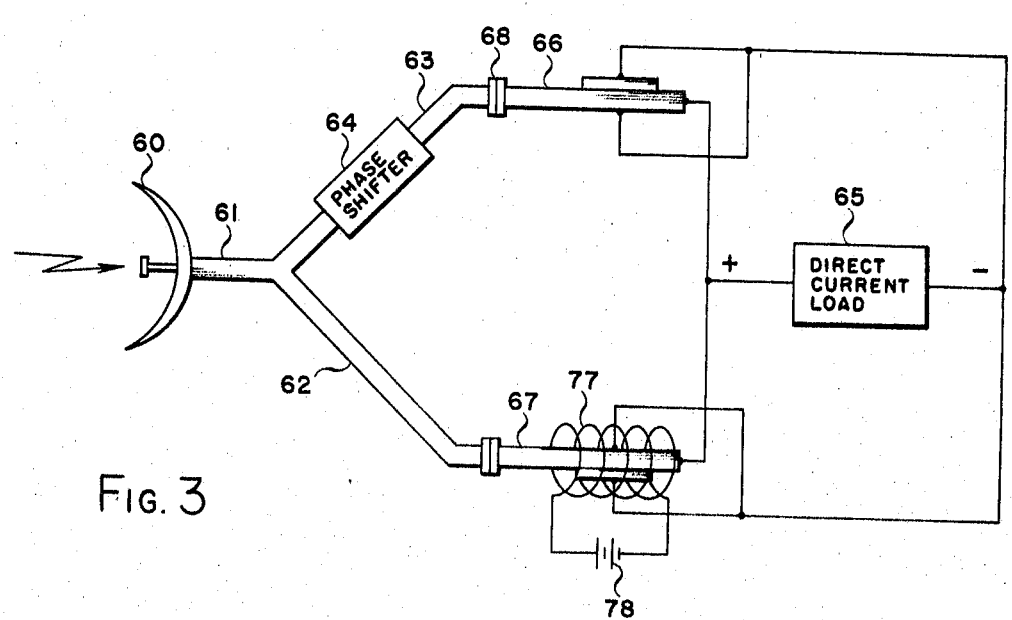
FIGURE 3 shows schematically a microwave power beaming receiver system incorporating a modified form of this invention.

In FIGURES 3 and 4, a modified rectifier device is shown in a power beaming application wherein microwave energy is received by an antenna 60 from a remote microwave transmitter (not shown). The antenna gathers the energy in the beam and feeds it through waveguide 61 which splits the energy into the two legs 62 and 63 of the Y plumbing. One leg 63 includes a phase shifter 64 to shift the phase of the microwave energy in that leg with respect to the phase of the microwave energy in leg 62 for the purpose of obtaining a more ripple-free rectified output voltage at load 65, as will become more apparent later on. Microwave rectifiers 66 and 67 are coupled to legs 62 and 63, respectively, such as through use of suitable coupling flanges 68. Waveguide vacuum windows may be mounted in the waveguide at each coupling flange in a suitable manner like that illustrated in FIGURE 2. The microwave energy is applied to the rectifier cavity producing a multipactor discharge resulting in the collection of high energy electrons for the direct current load 65.

The construction of the modified rectifiers 66 and 67 is shown in FIGURE 4 wherein the cavity of each rectifier assumes the cross-sectional form of a ridged waveguide. The ridge 70 formed in one wide wall of the rectifier replaces the stepped blocks 26 and 27 of the FIGURE 2 configuration. Perforated electrodes 71 and 72, which may be similar in construction to perforated electrode 34 in the FIGURE 2 device, are mounted on the two wide walls of each rectifier 66 and 67; electrode 72 being located in the base wall of ridge 70 and electrode 71 being located in spaced generally parallel relationship therewith to produce a multipactor discharge on application of microwave energy to the rectifier cavity. High energy electrons produced by the multipactor discharge pass through the openings formed by the perforations in the electrodes and are collected by anodes 73 and 74 as direct current energy for driving load element 65. Covers 75 and 76 enclose the anodes 73 and 74 and seal the rectifier cavity for the high vacuum environment needed for the multipactor discharge.

Both rectifiers 66 and 67 are similar in construction as indicated in FIGURE 4 and both provide full wave rectification due to both electrodes 71 and 72 of each rectifier being perforated for passing high energy electrons. By phase shifting the microwave energy applied to one of the pair of rectifiers, the time displacement of the electron bunching at the anodes may be adjusted for smoothing the direct current output. A theoretical 90° phase shift of the microwave energy applied to one of the rectifiers with respect to the phase of the microwave energy applied to the other rectifier will produce the most ripple-free direct current output for driving load element 65. Additional smoothing of the output may of course be obtained by conventional electronic circuit techniques, if desired.

Secondary emission of the electrodes in the multipactor rectifier of the FIGURE 2 and FIGURE 4 configurations may be increased by generating a supplemental axial magnetic field in the cavity of the rectifier so as to give a more grazing angle of incidence to the secondary electrons with respect to their emitting surfaces. Such a magnetic field also has a tendency to focus the electron cloud of the multipactor discharge and overcome the defocusing effects of mutual repulsion of the electrons within the cloud. That is, the magnetic field will tend to increase the length of travel of the faster traveling electrons by bending the electron path. Thus, the electrons will tend to arrive in time phase at the opposite electrode which is required for efficient multipactor operation. Such a magnetic field may be generated by a coil 77 wrapped around the rectifier and generally in coaxial alignment with the rectifier cavity as shown in FIGURE 3. The coil may be energized by a suitable source of direct current such as battery 78. To avoid loading the coil, the waveguide is slotted longitudinally as at 132 in FIGURE 2— as is common practice in microwave technology (i.e., slotted waveguides are used extensively in microwave impedance measurements).

Figure 5:
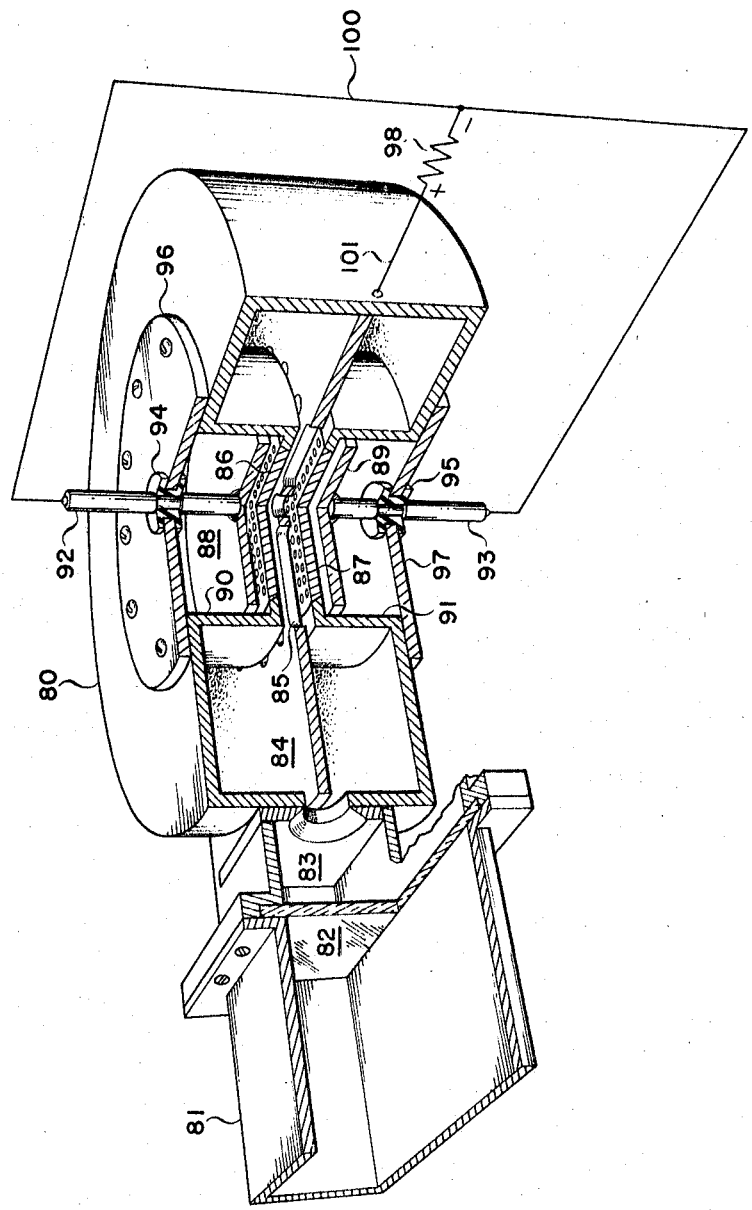
FIGURE 5 is a sectional perspective view showing still another form of the invention device.

In FIGURE 5, still another variation of the multipactor rectifier construction is disclosed wherein microwave energy is applied to a circular reentrant cavity 80 through input waveguide 81, vacuum window 82 and iris 83. Cavity 80 is preferably bifurcated by electrically conductive plate 84 and the plate is slotted as at 85 between perforated electrodes 86 and 87 to allow the multipactor discharge to take place across the two halves of the cavity. Bifurcating plate 84 essentially doubles the power handling of the cavity and doubles the obtainable DC voltage for a given microwave power density. Slots 85 in plate 84 are generally radially outward so as to have minimum effect on the microwave wall currents which flow radially outward in the region of the maximum voltage of the standing wave in the cavity. Also, by slotting the bifurcation so as not to allow microwave eddy currents to flow on the bifurcation surface, the heat losses are reduced to increase the rectification efficiency. At the same time, one achieves the narrow gap required for efficient multipactor discharge between the perforated electrodes 86 and 87.

Bifurcating plate 84 may be thermionically heated to give a copious supply of electrons, or it may be made of a material with a very high secondary emission coefficient, like electrodes 86 and 87.

Still referring to FIGURE 5, the electron collecting anodes 88 and 89 are suitably supported and insulated from the wall of the cavity adjacent the perforated electrodes within depressions 90 and 91. As shown, posts 92 and 93 on anodes 88 and 89, respectively, project through insulating bushings 94 and 95 carried on plates 96 and 97 secured to the flat wall of the cavity, one on one side and one on the other. Plates 96 and 97 serve not only to support anodes 88 and 89 but also to seal the cavity for maintaining a vacuum environment as necessary for efficient multipactor operation. The direct current output of the rectifier is applied to load element 98 connected in series between posts 92 and 93 and the cavity wall, as indicated by leads 100 and 101 in FIGURE 5.

Figure 6:
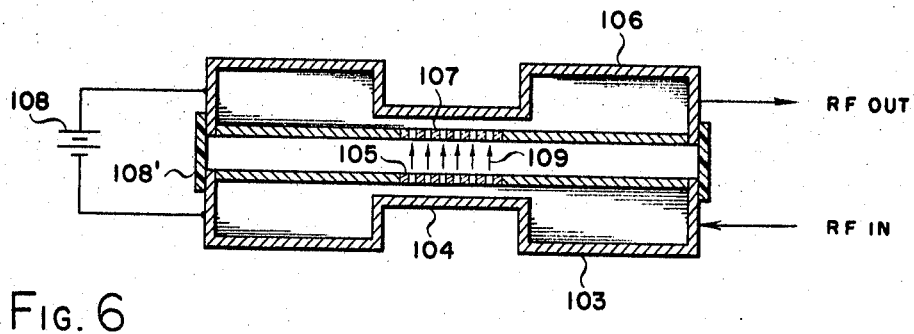
FIGURE 6 shows the multipactor device of this invention modified to function as a microwave amplifier.

The multipactor rectifier device, as previously described, may be readily adapted to operate as a microwave amplifier as schematically illustrated in FIGURE 6. The microwave or radio frequency (RF) energy is applied to rectifier cavity 103 to produce a multipactor discharge across electrodes 104 and 105. Electrode 105 is perforated so that high energy electrons in the electron cloud of the multipactor discharge are allowed to escape cavity 103 and enter a second cavity 106 through perforated electrode 107. Input cavity 103 and output cavity 106 are spaced apart with the volume therebetween being suitably vacuum sealed such as by insulating sleeve 108'. A direct current accelerating voltage is applied across the two cavities by a suitable source of electrical potential such as battery 108. The input cavity grid structure of perforated electrode 105 allows a high percentage of the electrons created by the multipactor discharge to escape into the interaction region indicated by arrows 109 where they are accelerated by the direct current voltage. The energy of the electron bunch in the interaction region is increased by the direct current accelerating voltage. The accelerated electron bunch is then guided into the second, or output, cavity 106 via perforated electrode structure 107, the perforations of which are in the shadow of the perforations of grid 105 to avoid interference with the electron bunch. Upon entering output cavity 106, the electron bunch encounters a retarding RF field and thus energy is delivered from the electron bunch into the field of the second RF cavity. Since the greater percentage of the electron energy was added by the direct current accelerating voltage, the device thus acts to amplify RF energy at the expense of the direct current energy. This device for amplifying RF energy retains many of the inherent advantages of the multipactor rectifier. In the first place, since the electron cloud in the multipactor discharge must be synchronized with the RF voltage, electrons issue from the first or input cavity 103 in a tightly defined bunch—no additional bunching is required. Secondly, since the device operates in a vacuum (where electrons are supplied by secondary emission from the electrodes), it has inherent high power handling capabilities and no filament power supplies are required. Also, relatively high electron current densities can be achieved in the multipactor discharge. Based on secondary emission characteristics of practical emission material, such as silver-magnesium alloy, the required direct current accelerating voltage is in the range from 1,000 to 10,000 volts which is a practical range. At X-band frequencies ($10^{10}$ cycles per second), the gap spacing between electrodes is of the order of 100 to $\frac{1}{10}$ inches depending on voltage level. These small gap spacings mean that little defocusing of electron bunch occurs. Moreover, the device is usable into the millimeter wavelength range and is fully capable of operating at low as well as high RF input power levels.

It should be recognized that in the amplifier of FIGURE 6, RF cavity 106 is the equivalent of the electron collecting anodes in the previously described rectifiers and that otherwise the specific structure may take the form of the several rectifier configurations herein described wherein direct current energy is added to the RF energy rather than extracted therefrom, as the high energy electrons produced by the multipactor discharge escape through the openings in the perforated electrode.

Figure 7:
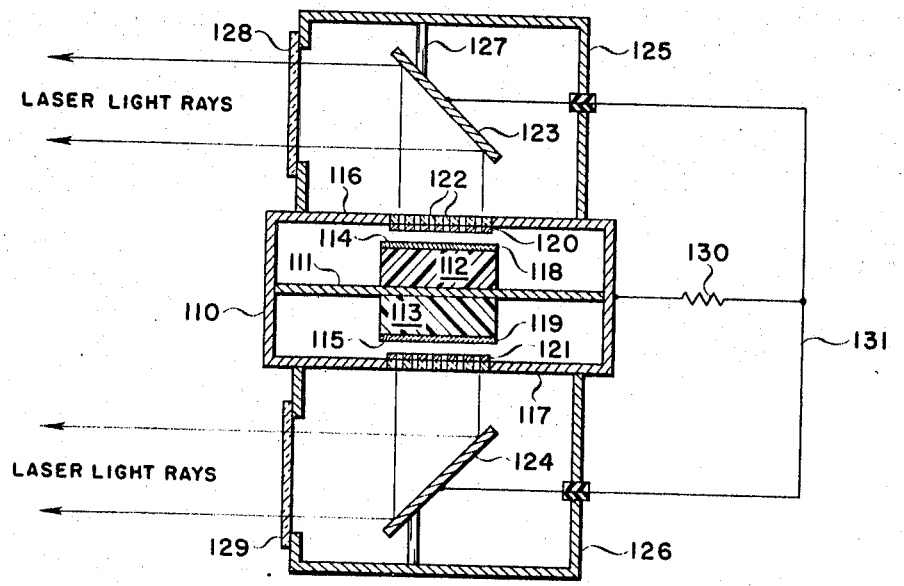
FIGURE 7 is a sectional perspective view showing further modification of the invention device for producing laser light.

A further and important modification of the multipactor rectifier of this invention is shown in FIGURE 7 for producing laser light. A waveguide cavity 110 adapted to receive RF energy is constructed generally in accordance with the rectifier configuration of FIGURE 2 wherein a bifurcating plate 111 provides structural support for spacers 112 and 113 providing generally flat surfaces 114 and 115 closely adjacent but spaced from wide walls 116 and 117, respectively, in the waveguide cavity. A fluorescent and secondary electron emitting material such as a conductive zinc-sulphur (ZnS) phosphor is applied as surface coatings 118 and 119 to surfaces 114 and 115, respectively, of spacers 112 and 113. The inner surfaces of walls 116 and 117 are similarly coated at 20 and 121 to provide secondary electron emitting electrodes for sustaining a multipactor discharge. Waveguide walls 116 and 117 in the area coated by the fluorescent electrode material are perforated with a number of holes 122 so that coatings 120 and 121 serve as perforated electrodes as in the FIGURE 2 construction. A pair of light reflective, electrically conductive anodes 123 and 124 are supported within housings 125 and 126 adjacent openings 122 by suitable means such as brackets 127 of dielectric material. The anodes are tilted to reflect light energy from holes 122 through windows 128 and 129 in housings 125 and 126. The housings serve to enclose the anodes and seal the cavity for maintaining a high vacuum environment for the multipactor discharge. The windows may be of any light transmissive material having sufficient structural strength to withstand the forces produced by the high vacuum maintained within the device itself.

High energy electrons collected on anodes 123 and 124 may be applied to a direct current load 130 through circuit 131. As with the other configurations disclosed herein, the load circuit 131 places load 130 in series with the anodes and the wall of cavity 130. Where utilization of the direct current energy is not desired, the load may be omitted although, when this is done, it may be necessary to ground the anodes.

When RF energy is applied to multipactor cavity 110, a multipactor discharge across the electrodes occurs. The resulting electron bunch supplied by secondary emission from the electrodes travels back and forth across the electrode gap in synchronism with the RF field. The high energy electrons in the multipactor discharge inject energy into the fluorescent electrode material which then emits secondary electrons (to keep the discharge going) as well as optical radiation. As is well known, fluorescent material such as used in cathode ray tubes has the dual property of emitting optical radiation as well as secondary electrons. In fact, secondary electron emission is a necessary characteristic to avoid biasing the cathode ray tube screen. Since this has been a necessary criteria for television operation, much research has been applied to high secondary emitting fluorescent screens. Data taken as far back as 1940 (H. W. Leverenz, "Cathodoluminescence as Applied to Television," RCA Review 5, October 1940, pages 131–175) indicates, for instance, screens with secondary electron emission coefficients greater than unity (a necessary requirement for a self-sustaining multipactor discharge) at impacting electron energies of 13,000 volts. These energy levels are compatible with microwave multipactor discharges. Such fluorescent materials also have a relatively enormous light output potential in the order of 900 kilowatts per square centimeter of optical radiation being theoretically obtainable. This optical radiation caused by primary electron bombardment can be "frozen in" fluorescent material for later optical energy release by ultraviolet or infrared radiation. These characteristics of fluorescent material make them highly suitable for producing laser light with a multipactor device such as disclosed by FIGURE 7. The general requirements for laser operation are: (1) a means of pumping in and storing optical energy in a medium and, (2) a technique for coherent (or in-phase) extraction of this optical energy. Both of these requirements are met with the multipactor discharge device of this invention using fluorescent electrodes.

Unlike prior art lasers, which utilize active volumes, the multipactor fluorescent laser of this invention employs an active surface which is much easier to cool. Thus, significantly higher powers are possible than are presently achieved with active volume lasers. Furthermore, since surfaces can be cooled, larger optical apertures are feasible.

The microwave multipactor discharge provides rapid modulation at high power levels. Experimental evidence indicates that the discharge can be turned on and off at a few cycles of RF approximating $10^{-10}$ to $10^{-9}$ seconds at microwave frequencies simply by application of a direct current bias. Furthermore, these discharges can modulate the megawatt microwave signal level. Thus, very rapid modulation of intense laser beams is made possible in contrast to the relatively low power, slower acting modulation presently possible.

Operation of the various forms of the rectifier is essentially the same. Microwave power is applied to the vacuum cavity, establishing a multipactor discharge. High energy electrons produced by the multipactor discharge, escape through perforations in the electrodes and are collected as pulsating direct current energy. The pulsating direct current energy may be utilized directly to perform useful work through a load or otherwise applied as in FIGURE 6 to accomplish microwave amplification. When operated in the FIGURE 7 version to produce laser light, the pulsating direct current energy may be utilized to perform useful work or biased to ground or otherwise suitably dissipated.

The several modifications and configurations for the multipactor device as disclosed herein are not intended to limit the invention but rather to provide a better understanding of its uses and purposes. Furthermore, it should be understood that various other modifications, alterations and substitutions may be made beyond those specifically disclosed herein without departing from the teachings of the invention.

I claim:

1. A multipactor device for converting microwave energy to direct current energy comprising, a source of microwave energy, a reentrant waveguide vacuum cavity, means feeding said microwave energy into said cavity, a coil around said cavity, a source of direct current potential coupled to said coil for generating an axial direct current magnetic field within said cavity, a pair of electrodes in said cavity spaced apart to form a gap across which said microwave energy will produce a multipactor discharge, at least one of said electrodes forming a wall portion of said cavity and having a plurality of openings formed therethrough to pass high energy electrons generated by the multipactor discharge, an enclosure over said openings for maintaining the vacuum environment in said cavity, an electrically isolated anode carried within said enclosure for collecting said high energy electrons, and a load circuit grounding said anode.

References Cited

UNITED STATES PATENTS

| | | | |
|---|---|---|---|
| 2,071,517 | 2/1937 | Farnsworth | 328—243 |
| 2,912,620 | 11/1959 | Mullett | 315—5.12 |
| 3,023,380 | 2/1962 | Hill | 333—13 |
| 3,201,640 | 8/1965 | Farnsworth. | |
| 3,205,462 | 9/1965 | Meinke. | |
| 3,278,865 | 10/1966 | Forrer. | |
| 3,348,169 | 10/1967 | Tomiyasu | 313—103 X |

JOHN F. COUCH, Primary Examiner

W. H. BEHA, Jr., Assistant Examiner

U.S. Cl. X.R.

313—104; 328—243; 333—98